United States Patent
Grzeskowiak et al.

(10) Patent No.: US 12,057,874 B2
(45) Date of Patent: Aug. 6, 2024

(54) ADAPTIVE DEVICE FOR REDUCING THE NOISE OF AN FM RADIO SIGNAL

(71) Applicant: Continental Automotive Technologies GmbH, Hannover (DE)

(72) Inventors: Jean-Christophe Grzeskowiak, Toulouse (FR); Chao Lin, Toulouse (FR)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 18/271,519

(22) PCT Filed: Jan. 14, 2022

(86) PCT No.: PCT/EP2022/050717
§ 371 (c)(1),
(2) Date: Jul. 10, 2023

(87) PCT Pub. No.: WO2022/152831
PCT Pub. Date: Jul. 21, 2022

(65) Prior Publication Data
US 2024/0039566 A1    Feb. 1, 2024

(30) Foreign Application Priority Data
Jan. 15, 2021 (FR) ...................................... 2100370

(51) Int. Cl.
*H04B 1/10* (2006.01)
(52) U.S. Cl.
CPC ... *H04B 1/1027* (2013.01); *H04B 2001/1045* (2013.01); *H04B 2001/1072* (2013.01)
(58) Field of Classification Search
CPC .................................................... H04B 1/1027
(Continued)

(56) References Cited

U.S. PATENT DOCUMENTS

| | | | |
|---|---|---|---|
| 5,390,344 A | 2/1995 | Nagata | |
| 6,487,529 B1 | 11/2002 | Miet | |

(Continued)

FOREIGN PATENT DOCUMENTS

| | | |
|---|---|---|
| CN | 105895110 A | 8/2016 |
| EP | 0700166 A2 | 3/1996 |
| FR | 3049132 A1 | 9/2017 |

OTHER PUBLICATIONS

International Search Report and Written Opinion for International Application No. PCT/EP2022/050717, mailed Mar. 7, 2022, 14 pages.

(Continued)

*Primary Examiner* — Lihong Yu
(74) *Attorney, Agent, or Firm* — Buchanan Ingersoll & Rooney PC

(57) ABSTRACT

A device for reducing noise in a radio signal received in the FM band is proposed, including: a module for demodulating the radio signal, adapted to generate a demodulated radio signal on the basis of the received radio signal; a noise suppression module adapted to replace a temporal sequence of the demodulated radio signal with a denoised sequence; a module for controlling the noise suppression module, adapted to control the activation of the noise suppression module. The noise reduction device further including a module for analyzing the frequency spectrum of the received radio signal. The control module is configured to control the noise suppression module according to an activation strategy chosen from among several predetermined activation strategies depending on the spectral content of the received radio signal.

10 Claims, 1 Drawing Sheet

(58) Field of Classification Search
USPC .......................................................... 375/346
See application file for complete search history.

(56) References Cited

U.S. PATENT DOCUMENTS

| | | | |
|---|---|---|---|
| 6,577,851 | B1 | 6/2003 | Ecklund et al. |
| 2009/0197556 | A1* | 8/2009 | Iwakuni ............... H04B 1/1027 |
| | | | 455/226.3 |
| 2009/0274251 | A1* | 11/2009 | Gozen .................... H04H 40/72 |
| | | | 375/346 |
| 2014/0153628 | A1* | 6/2014 | Vojcic ............... H03M 13/6325 |
| | | | 375/227 |
| 2019/0103891 | A1 | 4/2019 | Lin et al. |
| 2020/0195393 | A1* | 6/2020 | Alsuhaili .............. H04L 5/0007 |

OTHER PUBLICATIONS

International Search Report and Written Opinion for International Application No. PCT/EP2022/050717, mailed Mar. 7, 2022, 11 pages (French).
French Search Report for French Application No. 2100370, dated Sep. 24, 2021 with translation, 9 pages.
Saber et al., "Raspberry Pi and RTL-SDR for Spectrum Sensing based on FM Real Signals", 2018 6th International Conference on Multimedia Computing and Systems (ICMCS), IEEE, May 10, 2018, pp. 1-6, XP033439738.
English Translation of the Written Opinion for International Application No. PCT/EP2022/050717, mailed March 7. 2022, 4 pages.

* cited by examiner

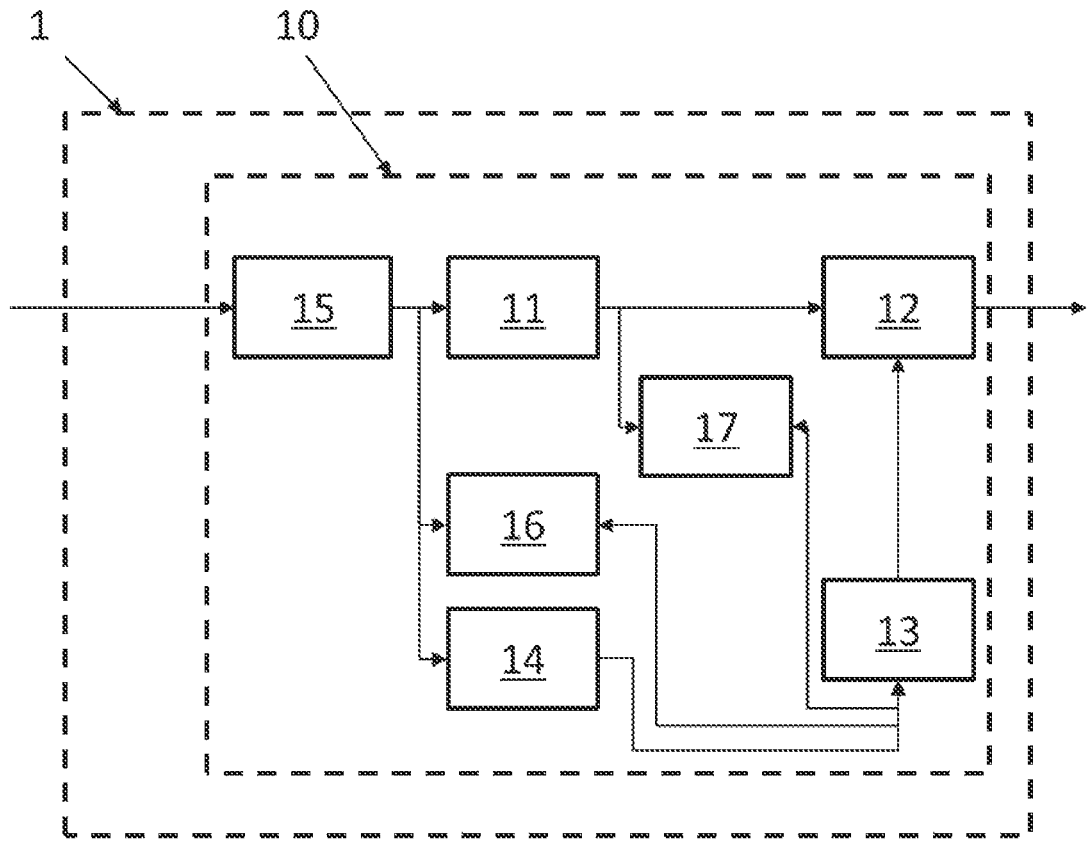
FIG. 1
FIG. 2
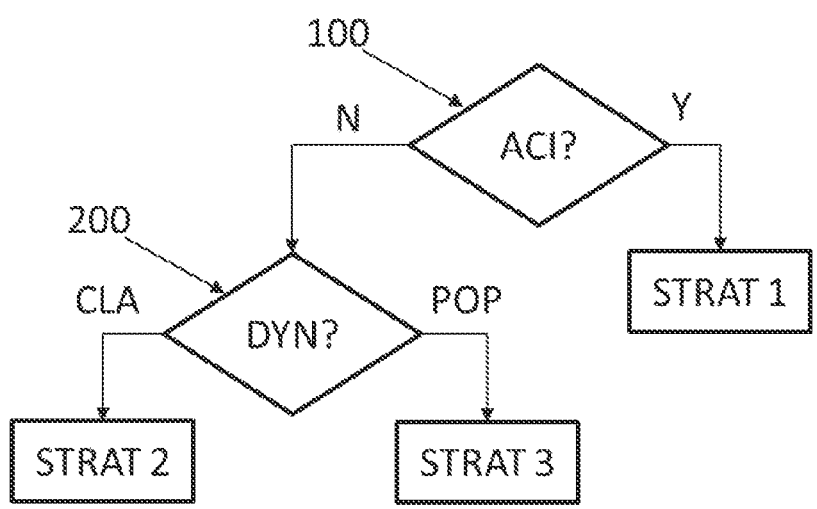

ADAPTIVE DEVICE FOR REDUCING THE NOISE OF AN FM RADIO SIGNAL

CROSS REFERENCE TO RELATED APPLICATIONS

This application is the U.S. National Phase Application of PCT International Application No. PCT/EP2022/050717, filed Jan. 14, 2022, which claims priority to French Patent Application No. 2100370, filed Jan. 15, 2021, the contents of such applications being incorporated by reference herein.

FIELD OF THE INVENTION

The present disclosure relates to a device for reducing noise in a received FM radio signal, in particular impulse noise, and is notably intended to be integrated into a radio receiver installed in a motor vehicle.

BACKGROUND OF THE INVENTION

Radio receivers conventionally comprise a noise reduction device, comprising a module for demodulating the received radio signal, and a noise suppression module, known as a noise blanker.

An example of a noise suppression module configured to replace a noisy portion of a signal with a blank signal portion is notably described in the document U.S. Pat. No. 6,577,851, incorporated herein by reference.

In other cases, the noise suppression module may replace a noisy portion of a signal with a portion reconstructed on the basis of certain components of the noisy portion.

In any case, it is necessary to set a strategy relating to the detection of the noisy portions and the activation of the noise suppression module which performs well. Indeed, ineffective detection of the noisy portions does not make it possible to eliminate the noise satisfactorily enough. On the other hand, as the techniques referred to as blanking or noise suppression techniques may introduce distortion into the returned audio signal, too strict a strategy for activating the noise suppression module should be avoided.

In order to ensure satisfactory noise reduction, in the patent application FR3049132, incorporated herein by reference, a method for limiting the impulse noise in a radio signal is proposed in which the noise suppression module is activated depending on a deduction of a drop in modulus of the ratio between the in-phase component and the quadrature component of the modulated received radio signal, and on a detection of high-frequency noise in the demodulated received radio signal.

In this solution, the thresholds proposed for the two detections are determined by experts during the calibration of the device and are then set definitively.

However, this adjustment is not necessarily adapted to all situations and to all types of audio content. For example, when the audio content relates to pop music, listeners are less sensitive to noise than when it relates to classical music or a talk program.

There is therefore a need to mitigate this drawback.

SUMMARY OF THE INVENTION

Taking the preceding text into account, one aim of the present disclosure is to propose a device for reducing noise in a radio signal which makes it possible to eliminate the noise in a way which is adapted depending on the content of the signal.

In this regard, a device for reducing noise in a radio signal received in the FM band is proposed, comprising:
  a module for demodulating the radio signal, adapted to generate a demodulated radio signal on the basis of the received radio signal,
  a noise suppression module adapted to replace a temporal sequence of the demodulated radio signal with a denoised sequence,
  a module for controlling the noise suppression module, adapted to control the activation of the noise suppression module,
the noise reduction device being characterized in that it further comprises a module for analyzing the frequency spectrum of the received radio signal, and in that the control module is configured to control the noise suppression module according to an activation strategy chosen from among several predetermined activation strategies depending on the spectral content of the received radio signal.

In some embodiments, the predetermined activation strategies comprise a first strategy in the event of adjacent channel interference, a second strategy in the absence of adjacent channel interference and in the event of a weakly dynamic frequency spectrum of the received radio signal, and a third strategy in the absence of adjacent channel interference and in the event of a strongly dynamic frequency spectrum of the received radio signal.

In some embodiments, the noise reduction device further comprises:
  a module for detecting high-frequency noise in the demodulated radio signal, depending on a threshold for detecting high-frequency noise,
  a module for detecting a drop in the modulus of the ratio between the in-phase component and the quadrature component of the modulated radio signal, depending on a threshold for detecting a drop in modulus,
in which the control module is adapted to activate the noise suppression module depending on a detection of high-frequency noise and on a detection of a drop in the modulus of the ratio between the in-phase component and the quadrature component,
and the control module is further adapted to set the values of the threshold for detecting high-frequency noise and of the threshold for detecting a drop in modulus depending on the selected activation strategy.

In some embodiments, the values of the threshold for detecting high-frequency noise and of the threshold for detecting a drop in modulus corresponding to the first strategy are, respectively, between the values of the threshold for detecting high-frequency noise and of the threshold for detecting a drop in modulus corresponding to the second and to the third activation strategies.

In some embodiments, the device further comprises a module for converting the frequency of the received radio signal to an intermediate frequency, and the module for analyzing the frequency spectrum is adapted to analyze the frequency spectrum of the signal coming from the frequency conversion module.

In some embodiments, the spectral analysis module is adapted to detect adjacent channel interference and, in the event of adjacent channel interference being detected, the control module is configured to implement a first strategy for activating the noise suppression module.

In some embodiments, in order to detect adjacent channel interference, the spectral analysis module is configured to:
  determine a ratio between an energy of the frequency spectrum at a frequency contained in a central band of the spectrum and an energy of the frequency spectrum at a frequency contained in a band located at one end of the spectrum, compare the ratio with a predetermined threshold and, if the ratio is below the threshold, detect adjacent channel interference.

In some embodiments, in the absence of adjacent channel interference, the spectral analysis module is further adapted to determine whether the frequency spectrum of the radio signal is weakly or strongly dynamic, and the control module is configured to implement, respectively, a second strategy for activating the noise suppression module which is suitable for weakly dynamic content or a third strategy for activating the noise suppression module which is suitable for strongly dynamic content.

In some embodiments, the spectral analysis module is configured to determine a temporal variation in the energy of the signal at a frequency contained in a central band of the spectrum, compare the temporal variation with a predetermined threshold, and determine the sound content of the radio signal as being weakly dynamic if the temporal variation is below said threshold, and strongly dynamic if the temporal variation is above said threshold.

In some embodiments, the noise suppression module is adapted to replace a temporal sequence of the demodulated signal with a sequence obtained by polynomial interpolation between a final noiseless sample and a returned noiseless sample.

According to another aspect, an FM radio receiver device which is able to receive and to demodulate a multiplexed FM radio signal is proposed, characterized in that it comprises a noise reduction device according to the preceding description.

According to another aspect, a method for reducing noise in a received FM radio signal is proposed, comprising implementing the steps of:

analyzing the frequency spectrum of the received radio signal, on the basis of the performed analysis, selecting a noise suppression strategy from a set of predetermined strategies, and implementing noise suppression in accordance with the selected strategy.

In some embodiments, analyzing the frequency spectrum of the received radio signal comprises:

determining a ratio between an energy of the frequency spectrum of the radio signal at a frequency contained in a central band of the spectrum and an energy of the signal at a frequency contained in a band located at one end of the spectrum and, if the ratio is below a determined threshold, selecting a first activation strategy, otherwise determining a temporal variation in the energy of the frequency spectrum of the radio signal at a frequency contained in a central band of the spectrum, comparing the temporal variation with a predetermined threshold and, if said temporal variation is below a threshold, selecting a second activation strategy, otherwise, selecting a third activation strategy.

The proposed noise reduction device comprises a noise reduction module which may be selectively activated according to various activation strategies according to the frequency content of the received signal. The activation strategies correspond to higher or lower thresholds for detecting noise, and consequently more or less strict conditions for activating the noise suppression module.

In this way, it is possible to lower the thresholds for detecting noise for audio content for which the noise will be more easily perceived by the listener, such as, for example, classical music, in contrast to pop music, where the thresholds for detecting noise may be higher.

BRIEF DESCRIPTION OF THE DRAWINGS

Other features, details and advantages will become apparent from reading the following detailed description and from examining the appended drawings, in which:

FIG. 1 shows a radio receiver device comprising a noise reduction device according to one embodiment.

FIG. 2 shows a method for selecting a strategy for activating a noise suppression module implemented by a noise reduction device according to one embodiment.

DESCRIPTION OF THE EMBODIMENTS

Reference is now made to FIG. 1, which schematically depicts an FM radio receiver device, which may typically but non-limitingly be installed on board a motor vehicle. The radio receiver device 1 comprises an antenna (which is not depicted) making it possible to pick up a radio signal, and a noise reduction device 10, which is adapted to demodulate the received radio signal while at the same time suppressing the noise which it contains, in particular the impulse or multi-path noise.

In what follows, the various modules of the noise reduction device 10 may be analog or digital modules.

The FM received signal is modulated in a manner known per se using a quadrature amplitude modulation technique so that the FM received signal is modulated and has an in-phase component I and a quadrature component.

The noise reduction device 10 comprises a module 11 for demodulating the received signal, adapted to generate a demodulated radio signal on the basis of the received signal, a noise suppression module 12, adapted to replace a temporal sequence of the demodulated radio signal with a denoised sequence, and a module 13 for controlling the noise suppression module, adapted to control the activation of the noise suppression module 12 depending on an activation strategy. In what follows, an activation strategy corresponds to a higher or lower threshold for detecting noise, on the basis of which the control module 13 does or does not activate the noise suppression module.

In some embodiments, the noise suppression module 12 may be adapted to replace a sequence of the radio signal with a blank signal portion. In a variant, the noise suppression module 12 may replace a noisy sequence of the signal with a sequence constructed by polynomial interpolation between the final noiseless signal sample and a first returned noiseless sample. Reference may, for example, be made to the document FR3049132 for more details.

The control module 13 is configured to control the activation of the noise suppression module according to an activation strategy chosen from a plurality of predetermined activation strategies, depending on the spectral content of the received radio signal.

Advantageously, at least two and preferably at least three predetermined activation strategies are provided for.

In one embodiment, the control module 13 has two activation strategies adapted, respectively, for a frequency spectrum of the radio signal which is, respectively, weakly or strongly dynamic. A weakly dynamic frequency spectrum may correspond, for example, to classical music or to a talk program. In these cases, the listener is more sensitive to the presence of noise and the strategy for activating the noise suppression module must be stricter, by having a lower threshold for detecting noise. A highly dynamic frequency spectrum may, for its part, relate to pop music, for which the presence of noise is less troublesome as it interferes less with listening. In this case, the strategy for activating the noise suppression module may be less strict, by having a higher threshold for detecting noise.

In one embodiment, the control module 13 has a third activation strategy, in the event that the received signal comprises adjacent channel interference (ACI). In this case, it is necessary to activate the noise suppression module frequently in order to guard against this interference, and therefore to have a specific activation strategy.

In order for the control module 13 to be able to determine an activation strategy to be selected from among the predetermined strategies, the noise reduction device 10 further comprises a module 14 for analyzing the frequency spectrum of the received radio signal. With reference to FIG. 2, an example of an implementation of an analysis of the frequency spectrum of the received signal with a view to determining an appropriate strategy for activating the noise suppression module.

The module 14 for analyzing the frequency spectrum is configured to determine 100, preferably in the first place, whether the radio signal comprises adjacent channel interference, this being denoted by the query "ACI?" in FIG. 2.

The noise reduction device 10 conventionally comprises a module 15 for converting the frequency of the received signal to an intermediate frequency, this conversion module being located upstream of the demodulation module 11, and the module 14 for analyzing the frequency spectrum is adapted to analyze the frequency spectrum of the signal coming from the frequency conversion module, in order to compare the energy of the spectrum at a frequency located in a central frequency band of the signal, for example the central frequency, with the energy of the spectrum at a frequency contained in a band located at the end of the spectrum. The energy of the spectrum in a determined frequency band may be obtained by integrating or summing the power spectral densities of the signal for the frequencies which are contained in the band. The analysis module 14 may, for example, compute a ratio between the energy in the central band and the energy in the end band of the spectrum.

For example, if the band in which the signal is transmitted has a bandwidth L with a central frequency f, then the ends of the spectrum may be considered to comprise the frequencies contained in the intervals [f−L/2; f−L/2+0.2 L] and [f+L/2−0.2 L; f+L/2]. The central band of the spectrum may also, for example, be considered to correspond to a frequency band in the interval [f−L/10; f+L/10] or [f−L/5; f+L/5].

By way of example, in the case of the FM band, the width of the band in which the signal is transmitted is about 100 kHz. A frequency band located at the end of the spectrum may be outside an 80 kHz range centered on the central frequency of the band.

Once the ratio between the energy of the signal at a central frequency and the energy of the signal at a frequency at one end of the spectrum has been computed, this ratio is compared by the analysis module 14 with a predetermined threshold. This threshold is, for example, greater than or equal to 1, for example greater than or equal to 1.5.

If the ratio is below the threshold, this means that the received signal has considerable content at the ends of the frequency band which is allocated to the signal, whereas the signal should normally be centered in this frequency band, and this therefore makes it possible to detect the presence of adjacent channel interference (the arrow Y coming out of the step 100). In this case, the analysis module 14 transmits, to the control module 13, an item of information on the detection of adjacent channel interference and the control module selects the corresponding strategy for activating the noise suppression module, denoted "STRAT1" in FIG. 2.

If, on the other hand, the ratio is above the threshold, no adjacent channel interference is detected (the arrow N coming out of the step 100).

The frequency analysis module is then configured to determine 200 whether the frequency spectrum of the received signal is weakly or strongly dynamic, this being denoted by the query "DYN?" in FIG. 2. This analysis is also implemented on the signal at the output of the frequency conversion module.

In order to carry out this analysis, the frequency analysis module computes the temporal variation in the energy of the signal at a frequency located in a central band of the spectrum, and compares this temporal variation with a predetermined threshold. If the temporal variation is below the threshold, then the frequency spectrum of the signal is considered to be weakly dynamic (the arrow "CLA" in FIG. 2) and, if the temporal variation is above the threshold, the frequency spectrum is considered to be strongly dynamic (the arrow "POP" in FIG. 2). The result of this determination is transmitted to the module for controlling the noise suppression module, which consequently selects the strategy for activating the noise suppression module. In FIG. 2 the activation strategy corresponding to a weakly dynamic frequency spectrum is denoted "STRAT2" and the activation strategy corresponding to a strongly dynamic spectrum is denoted "STRAT3".

In one embodiment, the activation strategies correspond to values of the threshold for detecting noise.

Thus, the noise reduction device 2 may also comprise a module 16 for detecting a drop in the modulus of the ratio between the in-phase component and the quadrature component of the modulated radio signal, denoted below the modulus I/Q depending on a threshold for detecting a drop in modulus SI/Q. This module may be located downstream of the module for converting the frequency to an intermediate frequency.

The noise reduction device 2 also comprises a module 17 for detecting high-frequency noise in the demodulated radio signal, which detects the existence of high-frequency peaks in the demodulated radio signal, by comparing these peaks with a frequency threshold, called the threshold for detecting high-frequency noise SHF below.

The module 16 for detecting a drop in the modulus I/Q and the module 17 for detecting high-frequency noise are configured to communicate, to the control module 13, the fact of having detected a drop in modulus I/Q or high-frequency noise, respectively, through the corresponding threshold being crossed. The control module 13 activates the noise suppression module 12 when the two detection thresholds of the modules 16 and 17, respectively, have been crossed.

In this embodiment, the various strategies for activating the noise suppression module 12 correspond to respective values of the thresholds for detecting a drop in modulus and for detecting high-frequency noise, which are set by the control module 13 at the end of the analysis implemented by the frequency analysis module.

Thus, the values of these thresholds are denoted by the index "ACI" in the event of adjacent band interference being detected, the values of these thresholds are denoted by the index "POP" in the absence of adjacent band interference and in the event of strongly dynamic spectral content, and the values of these thresholds are denoted by the index "CLA" in the absence of adjacent band interference and in the event of weakly dynamic spectral content.

The thresholds are set so that: SI/Q,CLA<SI/Q,ACI<SI/Q,POP and SHF,CLA<SHF,ACI<SHF,POP.

The thresholds corresponding to weakly dynamic spectral content are the lowest, this meaning that they correspond to very frequent activation of the noise suppression module 12. The thresholds corresponding to strongly dynamic spectral content are the highest, this meaning rarer activation of the noise suppression module. Finally, the thresholds used in the event of adjacent channel interference are between the two since frequent activation of the noise suppression module 12 is necessary for effectively preventing this type of interference.

The invention claimed is:

1. A device for reducing noise in a radio signal received in a frequency modulation (FM) band, comprising:
    a module for demodulating the radio signal, adapted to generate a demodulated radio signal on the basis of the received radio signal,
    a noise suppression module adapted to replace a temporal sequence of the demodulated radio signal with a denoised sequence,
    a module for detecting high-frequency noise in the demodulated radio signal, depending on a threshold for detecting high-frequency noise, and
    a module for detecting a drop in a modulus of a ratio between an in-phase component and a quadrature component of the demodulated radio signal, depending on a threshold for detecting a drop in modulus,
    a module for controlling the noise suppression module, adapted to control the activation of the noise suppression module, the control module adapted to activate the noise suppression module depending on detection of high-frequency noise and on detection of a drop in the modulus of the ratio between the in-phase component and the quadrature component, a module for analyzing a frequency spectrum of the received radio signal, and the control module is configured to control the noise suppression module so as to implement:
        a first strategy when the analysis module determines adjacent channel interference,
        a second strategy when the analysis module determines an absence of adjacent channel interference and a weakly dynamic frequency spectrum of the received radio signal, and
        a third strategy when the analysis module determines an absence of adjacent channel interference and a strongly dynamic frequency spectrum of the received radio signal,
    wherein the control module is further adapted to set values of the threshold for detecting high-frequency noise and of the threshold for detecting a drop in modulus depending on the selected activation strategy.

2. The noise reduction device as claimed in claim 1, in which the values of the threshold for detecting high-frequency noise and of the threshold for detecting a drop in modulus corresponding to the first strategy are, respectively, between the values of the threshold for detecting high-frequency noise and of the threshold for detecting a drop in modulus corresponding to the second and to the third activation strategies.

3. The noise reduction device as claimed in claim 1, further comprising a module for converting the frequency of the received radio signal to an intermediate frequency, and the module for analyzing the frequency spectrum is adapted to analyze the frequency spectrum of the signal coming from the frequency conversion module.

4. The noise reduction device as claimed in claim 1, in which the spectral analysis module is adapted to detect adjacent channel interference and, in the event of adjacent channel interference being detected, the control module is configured to implement the first strategy for activating the noise suppression module.

5. The noise reduction device as claimed in claim 4, wherein, in order to detect adjacent channel interference, the spectral analysis module is configured to:
    determine a ratio between an energy of the frequency spectrum at a frequency contained in a central band of the spectrum and an energy of the frequency spectrum at a frequency contained in a band located at one end of the spectrum,
    compare the ratio with a predetermined threshold and, if the ratio is below the threshold, detect adjacent channel interference.

6. The noise reduction device as claimed in claim 4, in which, in the absence of adjacent channel interference, the spectral analysis module is further adapted to determine whether the frequency spectrum of the radio signal is weakly or strongly dynamic, and the control module is configured to implement, respectively, the second strategy for activating the noise suppression module which is suitable for weakly dynamic content or the third strategy for activating the noise suppression module which is suitable for strongly dynamic content.

7. The noise reduction device as claimed in claim 6, in which the spectral analysis module is configured to determine a temporal variation in the energy of the signal at a frequency contained in a central band of the spectrum, compare the temporal variation with a predetermined threshold, and determine the sound content of the radio signal as being weakly dynamic if the temporal variation is below said threshold, and strongly dynamic if the temporal variation is above said threshold.

8. The noise reduction device as claimed in claim 1, in which the noise suppression module is adapted to replace a temporal sequence of the demodulated signal with a sequence obtained by polynomial interpolation between a final noiseless sample and a returned noiseless sample.

9. An FM radio receiver device which is able to receive and to demodulate a multiplexed FM radio signal, comprising a noise reduction device as claimed in claim 1.

10. A method for reducing noise in a received FM radio signal, comprising:
    analyzing a frequency spectrum of the received radio signal,
    demodulating the received radio signal,
    detecting if high-frequency noise is present in the demodulated radio signal, depending on a threshold for detecting high-frequency noise,
    detecting a drop in a modulus of a ratio between an in-phase component and a quadrature component of the demodulated radio signal, depending on a threshold for detecting a drop in modulus,
    activating noise suppression depending on the detection of the high-frequency noise and on the detection of the drop in the modulus of the ratio between the in-phase component and the quadrature component of the demodulated radio signal,
    determining a ratio between an energy of the frequency spectrum of the radio signal at a frequency contained in a central band of the spectrum and an energy of the signal at a frequency contained in a band located at one end of the spectrum and, if the ratio is below a determined threshold, selecting a first activation strategy, otherwise determining a temporal variation in the energy of the frequency spectrum of the radio signal at a frequency contained in a central band of the spectrum, comparing the temporal variation with a predetermined threshold and, if said temporal variation is below a threshold, selecting a second activation strategy, otherwise, selecting a third activation strategy, wherein the values of the threshold for detecting high-frequency noise and of the threshold for detecting a drop in modulus are set depending on the selected activation strategy.

* * * * *